(12) United States Patent
Sakurai et al.

(10) Patent No.: US 7,517,832 B2
(45) Date of Patent: Apr. 14, 2009

(54) FIBROUS ACTIVE CARBON AND NONWOVEN FABRIC INCLUDING THE SAME

(75) Inventors: Hiroshi Sakurai, Yamaguchi (JP); Mai Kitahara, Yamaguchi (JP); Masumi Hirata, Yamaguchi (JP); Toru Sawaki, Yamaguchi (JP)

(73) Assignee: Teijin Limited, Osaka (JP)

( * ) Notice: Subject to any disclaimer, the term of this patent is extended or adjusted under 35 U.S.C. 154(b) by 203 days.

(21) Appl. No.: 10/572,505

(22) PCT Filed: Sep. 16, 2004

(86) PCT No.: PCT/JP2004/013978

§ 371 (c)(1), (2), (4) Date: Mar. 17, 2006

(87) PCT Pub. No.: WO2005/028719

PCT Pub. Date: Mar. 31, 2005

(65) Prior Publication Data

US 2007/0054580 A1    Mar. 8, 2007

(30) Foreign Application Priority Data

Sep. 19, 2003    (JP)    ............... 2003-327509

(51) Int. Cl.
*C01B 31/08*    (2006.01)
(52) U.S. Cl. ................. 502/418; 264/29.7; 423/445 R; 502/423
(58) Field of Classification Search ................ 264/29.7; 423/445 R; 502/418, 423
See application file for complete search history.

(56) References Cited

FOREIGN PATENT DOCUMENTS

| CN | 1425499 A | 6/2003 |
|---|---|---|
| JP | 57-51809 | 3/1982 |
| JP | 57-51809 A | 3/1982 |
| JP | 62-163261 A | 7/1987 |
| JP | 03-064525 | 3/1991 |
| JP | 3-64525 A | 3/1991 |
| JP | 5-339818 A | 12/1993 |
| JP | 08-119614 | 5/1996 |
| JP | 2000-67873 A | 3/2000 |
| JP | 2002-38334 A | 2/2002 |
| JP | 2003-500822 | 1/2003 |
| JP | 2003-082533 * | 3/2003 |
| JP | 2003-82533 A | 3/2003 |
| JP | 2003-200052 | 7/2003 |
| JP | 2003-221217 | 8/2003 |
| WO | 03/026048 | 3/2003 |
| WO | 03/057367 | 7/2003 |

OTHER PUBLICATIONS

Y. Dzenis et al, "Continuous Carbon Nanofibers for Nanofiber Composites", Textile Technology Overseas, 203, No. 6, pp. 9-11, February.
Zhanlian Liu et al, "A Review of Research on Mesopore Activated Carbon Fiber", Materials Review, Feb. 2003, vol. 17, No. 2, pp. 40-42 and 57.

* cited by examiner

*Primary Examiner*—Stuart Hendrickson
(74) *Attorney, Agent, or Firm*—Sughrue Mion, PLLC (57) ABSTRACT

Disclosed is a fibrous activated carbon wherein fine pores in the surface of the activated carbon have diameters of 0.1-200 nm and the activated carbon is in the form of fiber having a fiber diameter of not more than 1000 nm.

5 Claims, 6 Drawing Sheets

FIBROUS ACTIVE CARBON AND NONWOVEN FABRIC INCLUDING THE SAME

TECHNICAL FIELD

The present invention relates to a fibrous active carbon and a nonwoven fabric including the same. More particularly, it relates to a fibrous active carbon and a nonwoven fabric including the same, to be preferably usable as an impurity removing filter, for example, for clean water, for effluent treatment, for the air, or the like, a material for an electric double layer capacitor, or a material for a fuel cell electrode.

Currently, there has been a demand for an active carbon further improved in functionalities, and various studies have been made.

A conventional fibrous active carbon is manufactured, similarly with the manufacturing of a granular active carbon, in principle, by placing a fibrous carbon under a high temperature of 800° C. or more, and allowing it to undergo a gasification reaction, a so-called activation reaction. It generally has a fiber diameter of 5 to 20 μm. Further, it is characterized by having an adsorption rate 100 to 1000 times that of a granular active carbon. However, on the other hand, it is made up of micropores mostly with a pore diameter of less than 2 nm. For this reason, for example, in the effluent treatment, it cannot capture macromolecules such as those of fumaric acid, unfavorably causing the formation of hazardous substances such as trihalomethane in the subsequent chlorination, or other problems.

Whereas, for example, also when it is used as an electrode material (positive electrode and negative electrode) of an electric double layer capacitor, it is said that the specific surface area part of pores with a pore diameter of 2 nm or more is involved in the electrostatic capacitance. Whereas, also with an aqueous solution type capacitor including a sulfuric acid aqueous solution as a solvent, for the performances at a high current density and low temperatures, the specific surface area part of pores of 2 nm or more is considered to contribute to the electrostatic capacitance. For this reason, there has been a demand for manufacturing of a fibrous active carbon with a pore diameter of 2 nm or more.

As a method for solving the foregoing, there is disclosed, for example, a method in which the one obtained by water vapor activating a carbonaceous raw material is further alkali activated, or a carbonaceous raw material is carbonized, and then, subjected to an oxidation treatment, and is further alkali activated, thereby to manufacture an active carbon in which the specific surface area of mesopores with a pore diameter of 2 nm or more is 1000 m$^2$/g or more (e.g., see, Patent Document 1). Whereas, there is disclosed a method in which a rare earth metal complex is added to a carbon precursor such as a pitch or a phenol resin, followed by water vapor activation, thereby to manufacture an active carbon with developed mesopores, or other method (e.g., see, Non-Patent Document 1).

However, each active carbon obtained with these methods is granular, and hence unfavorably, it is bad in moldability/processability. Whereas, as previously stated, a conventional fibrous active carbon has a fiber diameter of 5 to 20 μm, and has a small apparent specific surface area, and it has been desired to be further extremely reduced in fiber diameter.

[Patent Document 1] JP-A-8-119614
[Non-Patent Document 1] Proceedings of the 29th annual meeting of the Carbon Society of Japan, (2002) p. 92.

DISCLOSURE OF THE INVENTION

It is an object of the invention to provide an active carbon which solves the foregoing problem encountered with the related art, and is excellent in moldability and processability, and has a large apparent surface area.

BEST MODE FOR CARRYING OUT THE INVENTION

Below, the present invention will be described in details.

A fibrous active carbon of the invention has pores with a diameter of 0.1 to 200 nm. Herein, when the fibrous active carbon has a pore diameter of less than 0.1 nm, it can hardly adsorb molecules. On the other hand, when it has a pore diameter of more than 200 nm, it can adsorb macromolecules. However, the total specific surface area becomes very small, resulting in a reduction of the effects as the active carbon. The preferred range of the pore diameter is 0.3 to 150 nm.

Whereas, the fibrous active carbon of the invention is required to be in the form of a fiber, and to have a fiber diameter of less than 1000 nm. The fibrous active carbon of the invention is manufactured by, for example, subjecting a carbon precursor fiber to an activation treatment. At this step, the apparent surface area increases as the fibrous active carbon is microminiaturized in fiber diameter. For this reason, the total specific surface area of the fibrous active carbon also increases as the microminiaturization proceeds. The fiber diameter is preferably smaller in order to increase the total specific surface area of the fibrous active carbon. However, when it is smaller than the pore diameter, cutting of the fibrous active carbon occurs. For this reason, preferably, the fiber diameter of the fibrous active carbon is larger than the pore diameter, and 800 nm or less, and further, larger than the pore diameter, and 500 nm or less.

For the fibrous active carbon of the invention, the ratio of the specific surface area of the pores with a pore diameter of 2 nm or more, determined from the nitrogen adsorption isotherm and the total specific surface area of the fibrous active carbon is preferably 0.3 or more. When the ratio of the specific surface area of the pores with a pore diameter of 2 nm or more and the total specific surface area of the fibrous active carbon is 0.3 or more, macromolecules can be mostly adsorbed thereby.

Whereas, it is known that the electrolyte ions for use in the electric double layer capacitor are generally about 1 nm in size in the solvated state. For this reason, for efficiently storing electrolyte ions on the active carbon surface, 2- or more-nm mesopores are said to be effective. However, large mesopores cause the reduction of the specific surface area. This causes the reduction of the electrostatic capacitance. For the fibrous active carbon of the invention, the volume of pores with a pore diameter of 2 to 5 nm preferably accounts for 40% or more of the total pore volume. When the pore diameter is less than 2 nm, the electrolyte ions for use in the electric double layer capacitor cannot be sufficiently diffused/adsorbed because they are generally about 1 nm in size in the solvated state as previously stated is not preferably. On the other hand, when the pore diameter exceeds 5 nm, the specific surface area of the active carbon is reduced. As a result, unfavorably, a sufficient volume cannot be obtained. The volume of pores with a pore diameter of 2 to 5 nm is preferably 45% or more, and further preferably 50% more of the total pore volume.

For the fibrous active carbon of the invention, the total specific surface area preferably falls within a range of 100 to 50000 $m^2/g$. When the total specific surface area is 100 $m^2/g$ or more, the adsorption amount is further improved. The preferred range of the total specific surface area is 500 to 50000 $m^2/g$, and further 1000 to 50000 $m^2/g$.

In the invention, the fibrous active carbon can also be a nonwoven fabric. Then, out of the methods for manufacturing the fibrous active carbon of the invention, preferred some embodiments will be described.

The starting material of the fibrous active carbon of the invention has no particular restriction. However, examples thereof may include pitch, polyacrylonitrile, phenol resin, polycarbodiimide, polyimide, polybenzoxazole, and aramid. Out of these, pitch and polyacrylonitrile are preferred. Incidentally, out of pitches, a mesophase pitch is particularly preferred.

A method of manufacturing a fibrous active carbon from the starting material of the fibrous active carbon will be described in details in the order of (1) a method for manufacturing a precursor fiber of a fibrous active carbon, and (2) a method for manufacturing a fibrous active carbon from a precursor fiber of a fibrous active carbon.

(1) "Method for Manufacturing a Precursor of a Fibrous Active Carbon"

As one example for manufacturing a precursor of a fibrous active carbon, for example, mention may be made of an electrostatic spinning method or a blend spinning method. Below, the electrostatic spinning method and the blend spinning method will be described in details in this order.

"Electrostatic Spinning Method"

With the electrostatic spinning method, a starting material solution of a fibrous active carbon dissolved in a solvent is discharged into the electrostatic field formed between electrodes. The formed fibrous active carbon is accumulated on a collecting substrate. This can manufacture a precursor of the fibrous active carbon. Incidentally, the precursor fiber of the fibrous active carbon denotes not only the one from which the solvent of the solution has already been distilled away, and which has become a porous fiber, a fibrous laminated body, but also the one which still contains the solvent of the solution.

Herein, an apparatus for use in the electrostatic spinning method will be described. The electrode for use in the invention may be any of a metal, an inorganic substance, or an organic substance so long as it exhibits electric conductivity. Alternatively, it may also be the one having a thin film of a metal, an inorganic substance, or an organic substance exhibiting electric conductivity on an insulating material. The electrostatic field in the invention is formed between a pair of, or among a plurality of electrodes, and a high voltage may be applied to any of the electrodes. This includes, for example, the case where a total of three electrodes of two high-voltage electrodes different in voltage value (e.g., 15 kV and 10 kV) and an electrode connected to a ground are used, or includes the case where more than 3 electrodes are used.

Then, a technique for manufacturing a precursor of a fibrous active carbon with the electrostatic spinning method will be described in more details. First, there is a stage of manufacturing a solution of the starting material of the fibrous active carbon dissolved in a solvent. The concentration of the solution of the starting material of the fibrous active carbon dissolved in a solvent is preferably 1 to 30 wt %. When the concentration is smaller than 1 wt %, the concentration is too low, unfavorably making difficult the formation of a fiber structure. Whereas, at more than 30 wt %, the fiber diameter of the resulting fiber structure unfavorably becomes large. The more preferred concentration is 2 to 20 wt %.

In manufacturing of the precursor of the fibrous active carbon with the electrostatic spinning method, solvents may be used alone, or may be used in combination of a plurality of the solvents. The solvent has no particular restriction so long as it dissolves the starting material of the fibrous active carbon, and vaporizes at the stage of spinning with the electrostatic spinning method, to form a fiber. For example, mention may be made of acetone, chloroform, ethanol, isopropanol, methanol, toluene, tetrahydrofuran, water, benzene, benzyl alcohol, 1,4-dioxane, propanol, methylene chloride, carbon tetrachloride, cyclohexane, cyclohexanone, phenol, pyridine, trichloroethane, acetic acid, N,N-dimethylformamide, acetonitrile, N-methylmorpholine-N-oxide, 1,3-dioxalone, methyl ethyl ketone, or the like.

Whereas, any can be used as the starting material for the fibrous active carbon so long as it dissolves in the solvent, and may become an active carbon. However, polyacrylonitrile, aramid, polycarbodiimide, or polybenzoxazole can be preferably used.

Then, a stage of spinning the solution with the electrostatic spinning method will be described. For discharging the solution into the electrostatic field, any given method may be used.

Figure 1:
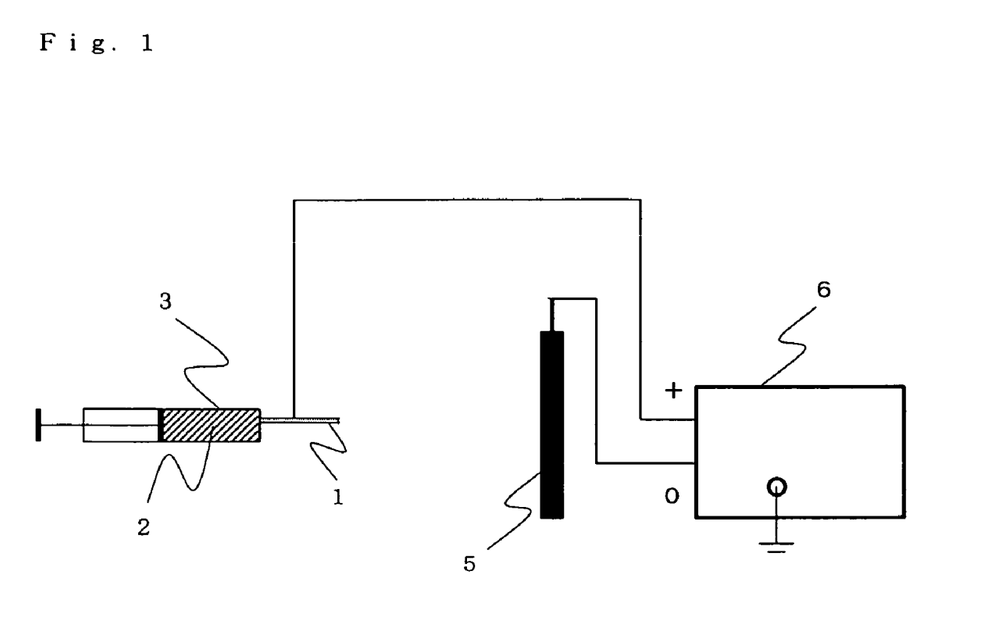
FIG. 1 is a diagram schematically showing one embodiment of a configuration of an apparatus for manufacturing a fibrous active carbon of the present invention.

Below, a more specific description will be given by reference to FIG. 1.

At the tip of the injection tube-like solution retaining cell (3 in FIG. 1), an injection needle-like solution jet nozzle (1 in FIG. 1) applied with a voltage by an appropriate means such as a high voltage generator (6 in FIG. 1) is set. Thus, a solution (2 in FIG. 1) is introduced to the solution jet nozzle tip portion. The tip of the solution jet nozzle (1 in FIG. 1) is placed at an appropriate distance from a grounded fibrous material collecting electrode (5 in FIG. 1), and the solution (2 in FIG. 1) is jetted from the tip portion of the solution jet nozzle (1 in FIG. 1). This allows the formation of a fibrous material between the nozzle tip portion and the fibrous material collecting electrode (5 in FIG. 1). The electrostatic spinning method does not depend upon the orientation of the electric field so long as an electrostatic field can be formed between electrodes. Therefore, it is also acceptable that the needle-like solution jet nozzle is grounded, and that the fibrous material collecting electrode is applied with a voltage.

Figure 2:
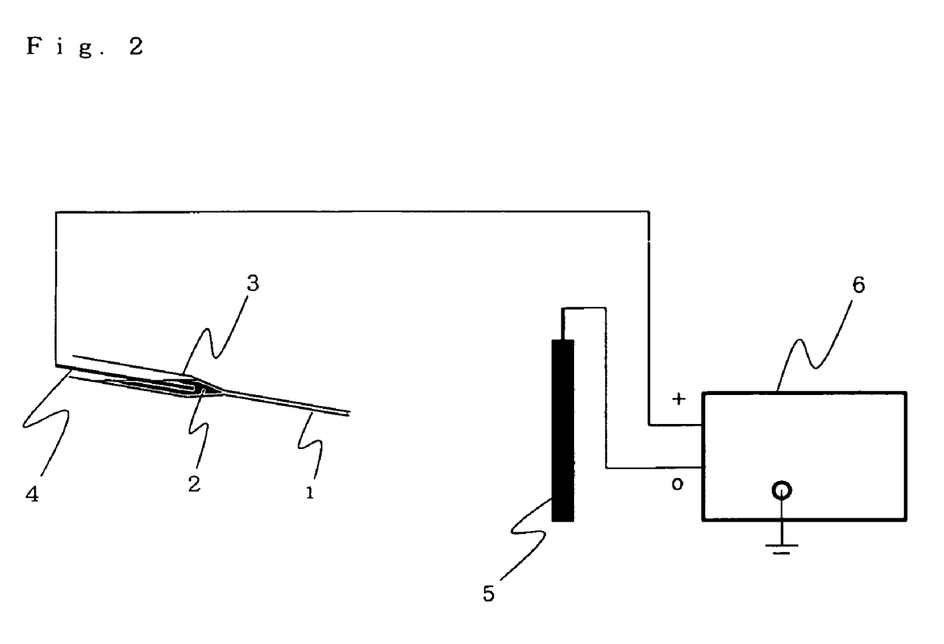
FIG. 2 is a diagram schematically showing another embodiment of a configuration of an apparatus for manufacturing a fibrous active carbon of the invention.

Further, as another embodiment, a description will be given by reference to FIG. 2. It is also possible to introduce fine droplets of the solution (not shown) into an electrostatic field. The only requirement for this is that the solution (2 in FIG. 2) is placed in an electrostatic field, and kept away from the fibrous material collecting electrode (5 in FIG. 2) at a distance such that fiber formation may occur. For example, in the solution (2 in FIG. 2) in the solution retaining cell (3 in FIG. 2) having the solution jet nozzle (1 in FIG. 2), an electrode (4 in FIG. 2) facing the fibrous material collecting electrode may be directly inserted.

When the solution is fed from the nozzle into the electrostatic field, several nozzles may be used in parallel to increase the production speed of the fibrous material. Whereas, the distance between the electrodes depends upon the charging amount, the nozzle dimensions, the amount of the solution jetted from the nozzle, the solution concentration, and the like. However, it is properly a distance of 5 to 20 cm when the potential difference between the electrodes is about 10 kV. Whereas, the electrostatic potential difference to be applied is generally 3 to 100 kV, preferably 5 to 50 kV, and further preferably 5 to 30 kV. The desirable potential difference may be formed by a given appropriate method known in the art.

The foregoing two embodiments are each the case where the electrode also serves as a collecting substrate. However, by setting a material which may serve as a collecting substrate between electrodes, it is also possible to set a collecting substrate separately from the electrodes, and to collect a fibrous laminated body therein. In this case, for example, a belt-like substance is set between electrodes, and this is allowed to serve as a collecting substrate, which enables continuous production.

Then, a description will be given to a stage of obtaining a fiber laminated body to be accumulated on the collecting substrate. In the invention, during the period in which the solution is spun toward the collecting substrate, the solvent is vaporized according to the conditions to form a fibrous material. At ordinary room temperature, the solvent is fully vaporized in the period until the collection on the collecting substrate is carried out. However, if the solvent vaporization is insufficient, spinning may be carried out under reduced pressure conditions. At the time point when collection on the collecting substrate has been carried out, at least a fiber structure (generally, in the form of a nonwoven fabric) satisfying the fiber average diameter and fiber length is formed. Whereas, the spinning temperature depends upon the vaporization behavior of the solvent or the viscosity of the spinning solution. However, in general, it falls within a range of 0 to 50° C.

The precursor of the fibrous active carbon obtained in the foregoing manner is burned, and then subjected to an activation treatment. As a result, it is possible to manufacture an objective fibrous active carbon or nonwoven fabric including a fibrous active carbon. As the burning conditions, it is preferably to carry out a 100 to 1500° C. treatment under an inert gas atmosphere. Incidentally, prior to performing the treatment, it is also preferable to previously perform a treatment under an oxygen-containing atmosphere.

As the activation treatment conditions, the conditions described in "Blend spinning method" described later can be adopted.

"Blend Spinning Method"

With the blend spinning method, a mixture substantially including a starting material for a fibrous active carbon and a thermoplastic resin is spun. Then, the starting material for a fibrous active carbon is subjected to a stabilization treatment, and subsequently, the thermoplastic resin is removed. As a result, it is possible to manufacture a fibrous carbon precursor.

Below, the blend spinning method will be described in details. With the blend spinning method, first, a mixture substantially including a thermoplastic resin and a starting material for a fibrous active carbon is manufactured.

Herein, the thermoplastic resin has no particular restriction. However, for example, polyolefins such as polyethylene, polypropylene, and poly-4-methylpentene-1, polyacrylate type polymers such as polymethacrylate and polymethyl methacrylate, polystyrene, and polycarbonate are preferably used. Out of these, particularly, polyolefin type ones such as polyethylene and poly-4-methylpentene-1 are preferably used.

Whereas, as the starting materials for the fibrous active carbon, pitch, polyacrylonitrile, polycarbodiimide, polyimide, polybenzoxazole, aramid, and the like are preferably used. However, out of these, polyacrylonitrile and pitch are particularly preferred, and a mesophase pitch is most preferably preferred.

The blending ratio of the thermoplastic resin and the starting material for the fibrous active carbon is preferably such that the starting material for the fibrous active carbon is charged in an amount of 1 to 150 parts by weight per 100 parts by weight of the thermoplastic resin. The method for mixing the thermoplastic resin and the starting material for the fibrous active carbon is preferably melt-kneading. For example, it is possible to manufacture the mixture by conventional equipment such as a uniaxial extruder, a biaxial extruder, a mixing roll, or a Banbury mixer.

Then, the mixture of the thermoplastic resin and the starting material for the fibrous active carbon obtained above is spun. In this step, the mixture in a molten state is spun, so that the starting material of the fibrous active carbon is drawn into a fiber in the thermoplastic resin. Incidentally, the molded product obtained by spinning may be drawn.

Then, the molded body obtained by spinning is subjected to stabilization (which is also referred to as curing or oxidizing). This step is a necessary step for manufacturing a precursor fiber of the fibrous active carbon. When this step is not carried out, and the removal of the thermoplastic resin, which is the subsequent step, is carried out, the starting material for the fibrous active carbon is unfavorably pyrolyzed or molten to destroy the fibrous form, or to cause other problems. The stabilization can be carried out by a known method such as a gas flow treatment of oxygen or the like, or a solution treatment of an acidic aqueous solution or the like. However, the stabilization under a gas flow is preferred from the viewpoint of the productivity. Incidentally, from the viewpoint of rapid stabilization of the starting material of the fibrous active carbon, oxygen and/or a mixed gas containing an iodine or bromine gas is preferably used. The softening point of the starting material for the fibrous active carbon is remarkably raised by the stabilization. However, the softening point is desirably 350° C. or more, and preferably 450° C. or more in order to obtain the precursor fiber of the objective fibrous active carbon.

Then, by removing the thermoplastic resin from the molded product subjected to the stabilization treatment, it is possible to obtain the precursor fiber of the objective fibrous active carbon. The method for removing the thermoplastic resin has no particular restriction, but the method is preferably accomplished by pyrolysis or dissolution by a solvent. Which method is adopted is determined according to the thermoplastic resin to be used. The conditions for pyrolysis differ according to the thermoplastic resin to be used. However, the treatment is preferably carried out at 400° C. or more, and preferably at 450° C. or more. Further, the conditions for the solvent solution also differ according to the thermoplastic resin to be used. A solvent with a higher solubility is preferably used. For example, methylene chloride or tetrahydrofuran may be preferably used for polycarbonate; and decalin or toluene, for polyethylene. Incidentally, the precursor fiber of the fibrous active carbon obtained after the removal of the thermoplastic resin may be further treated under a nitrogen atmosphere at 450 to 1500° C.

(2) Method for Manufacturing a Fibrous Active Carbon from the Precursor Fiber of the Fibrous Active Carbon With the method for manufacturing a fibrous active carbon from the precursor fiber of the fibrous active carbon obtained above, manufacturing can be carried out by a general activation method, water vapor activation or alkali activation, or a method of a combination of the two methods.

The water vapor activation method is a general granular active carbon activation method, and is carried out in the presence of water vapor at a temperature of 700° C. to 1500° C. The more preferred temperature range is 800° C. to 1300° C. For the activation treatment time, the treatment is desirably carried out for 3 to 180 minutes.

When the activation treatment time is less than 3 minutes, unfavorably, the specific surface area is remarkably reduced. On the other hand, when the time is longer than 180 minutes, unfavorably, not only the reduction of the productivity is caused, but also the carbonization yield is remarkably reduced.

As another method for manufacturing a fibrous active carbon from the precursor fiber of the fibrous active carbon, mention may be made of alkali activation. Alkali activation is a technique for obtaining an active carbon by impregnating a raw material with alkali hydroxide or alkali carbonate, and uniformly heating it to a prescribed temperature range. As the activators for use in alkali activation, for example, mention may be made of hydroxides of alkali metals such as KOH and NaOH, and hydroxides of alkaline-earth metals such as $Ba(OH)_2$. However, out of these, KOH and NaOH are preferred. The conditions for performing alkali activation differ according to the activator to be used, and hence cannot be determined indiscriminately. However, for example, when KOH is used, heating is performed up to a temperature of 400 to 1000° C., and preferably 550 to 800° C.

The alkali activation time may also be appropriately selected according to the heating rate and the treatment temperature. However, preferably, it is 1 second to several hours, and preferably 1 second to 1 hour at 550 to 800° C. The activator is generally used in the form of an aqueous solution. As the concentration, about 0.1 to 90 wt % is adopted.

When the aqueous solution concentration of the activator is less than 0.1 wt %, unfavorably, it is not possible to manufacture a fibrous active carbon with a high specific surface area. Whereas, when the concentration exceeds 90 wt %, unfavorably, not only it is not possible to manufacture a fibrous active carbon with a high specific surface area, but also the carbonization yield is reduced. The concentration is more preferably 1 to 50 wt %.

The precursor fiber of the fibrous active carbon is impregnated in an alkali aqueous solution, and uniformly heated to a prescribed temperature range. As a result, it is possible to obtain an objective fibrous active carbon. On the fibrous active carbon surface obtained above, an alkali, an alkali salt, or the like may be present. Therefore, treatments such as water washing and drying may be carried out.

On the precursor fiber of the fibrous active carbon, the foregoing water vapor activation or alkali activation, or a combination of the two is carried out. As a result, it is possible to obtain a fibrous active carbon having a pore diameter of 2 nm or more, and a fiber diameter of 500 nm or less.

The fibrous active carbon of the invention, obtained in the foregoing manner, can be used for an electrode material in an electric double layer capacitor having electrodes (positive electrode and negative electrode), a separator, and an electrolyte. To a fibrous active carbon, a binder and a conductive material are added, if required, followed by molding, resulting in electrodes, which may be formed on, for example, one surface or both surfaces of a current collector such as a metal foil or a metal gauze.

Any may be used as the binder so long as it is effective as an electric double layer capacitor electrode. However, polyvinylidene fluoride, polytetramethylene fluoride, fluorocarbon rubber, polyethylene, polypropylene, acrylic resin, or the like can be used. Whereas, as the conductive material, artificial graphite, carbon black (acetylene black), nickel powder, or the like is preferably used.

As the separator which is another component, and the electrolyte, any of the ones for use in a conventional known electric double layer capacitor can be used.

Whereas, the fibrous active carbon of the invention obtained in the foregoing manner is further immersed in $CO_2$ in the supercritical state together with a metal complex, followed by burning, also resulting in a material for a fuel cell electrode.

Herein, the metal ion of the metal complex is preferably at least one metal ion selected from the group consisting of platinum, rhodium, ruthenium, iridium, palladium, and osmium. The electrode material for a fuel cell has a catalytic activity for the oxidation reduction reaction in the fuel cell, and a conductivity for functioning as an electrode. By using the ion, it becomes easy to ensure mainly the catalytic activity.

Specific examples thereof may include platinum group amine complexes, platinum group chlorides such as potassium chloroplatinate, platinum group acetyl acetonate, and platinum group cyclooctadiene dimethyl. Out of these, platinum group acetyl acetonate and platinum group cyclooctadiene dimethyl are particularly preferred.

The degree of the conductivity for the resulting electrode material for a fuel cell to favorably function can be appropriately determined according to the intended use. However, generally, it is preferably $1 \times 10^5$ to $5 \times 10^6$ S/m. It is sufficient only that such a conductivity can be exerted at a stage where the material has become an electrode material for a fuel cell. At the previous stages, the material is not required to have a conductivity.

As the important requirement for obtaining favorable catalytic activity and conductivity as an electrode material for a fuel cell, further, a metal complex is uniformly dispersed in the fibrous active carbon. To this end, the fibrous active carbon is preferably brought in contact with a solution of a metal complex dissolved therein. However, for a general solvent, there is a large difference between the surface tension of the solvent and the surface tension of the fibrous active carbon. By mere contact of the fibrous active carbon with the solution of a metal complex dissolved therein, it is difficult to allow the metal complex to uniformly permeate into the fibrous active carbon. However, when $CO_2$ in the supercritical state is used for the solvent, it is possible that the metal complex is carried in the form of nano-order fine particles in a short time. Further, the step of drying the solvent, or the like can be omitted, and hence this method is a very excellent method. Incidentally, a solution obtained by previously dissolving a metal complex in a solvent can be used. However, the solvent in this case is for uniformly dispersing the metal complex in $CO_2$ in the supercritical state, rather than being helpful to the permeation of the metal complex.

Preferably, the temperature condition for using $CO_2$ in the supercritical state is 32° C. or more, the pressure falls within a range of 7.5 to 50 MPa, and the immersion treatment time falls within a range of 0.3 to 10 hours. The upper limit of the temperature condition varies according to the metal complex to be used. However, it is often 300° C. or less from the viewpoint of suppressing the decomposition of the metal complex.

Further, finally, after immersion in $CO_2$ in the supercritical state, a burning treatment is carried out. This burning treatment is carried out under an atmosphere substantially not containing oxygen, preferably at 200 to 3500° C., and more preferably at 200 to 2800° C. The proper temperature can be found according to the actual state.

As the temperature under an atmosphere substantially not containing oxygen, the oxygen concentration is preferably 20 ppm or less, and more preferably 10 ppm or less. Such an atmosphere can be implemented by flowing a high purity inert gas of nitrogen, argon, or the like into the system.

The overall structure of the resulting fuel cell electrode material may assume any form so long as it poses no hindrance in use as the material for the electrode. However, it preferably assumes the form of a nonwoven fabric from the viewpoint of handling. In this case, it preferably assumes the form of a nonwoven fabric when immersed in $CO_2$ in the supercritical state.

The fuel cell electrode material fabricated in this manner is different in structure from a conventional fuel cell electrode material in which carbon fibers are bonded by a carbide of a phenol resin, and assume a net-like porous structure where the fibers are in point contact with one another. Thus, although it is equal thereto in net-like porous structure, it is configured such that the constituent fiber itself is an active carbon. This not only facilitates a metal serving as a catalyst to be carried in the pores of the active carbon with ease, but also facilitates the material to be excellent in any of the gas flow property, the electric conductivity, the thermal conductivity, the mechanical strength, and the corrosion resistance as a material for a fuel cell electrode.

The electrode for a fuel cell can be formed by processing the material for a fuel cell electrode. Whereas, in forming the material for the fuel cell electrode, for example, the form of the intermediate prior to the burning treatment is set to be the one suitable for the form of the electrode for the fuel cell, for example, a fibrous fuel cell electrode material carrying a metal by a grinding treatment. As a result, it is also possible to allow the fuel cell electrode material obtained by the burning treatment to be usable as a fuel cell electrode as it is.

The fuel cell electrode made of the fuel cell electrode material, and a fuel cell including such a fuel cell electrode are excellent in terms of the performance, the stability, the life, and the cost.

EXAMPLES

Below, the invention will be more specifically described by way of examples, which should not be construed as limiting the scope of the invention.

The fiber diameter of the fibrous active carbon or the nonwoven fabric including the fibrous active carbon was measured by means of a scanning electron microscope (S-2400 manufactured by Hitachi Ltd.).

Whereas, the total specific surface area and the pore diameter distribution of the fibrous active carbon or the nonwoven fabric including the fibrous active carbon were calculated by means of a specific surface area/pore distribution measuring apparatus ("NOVA1200" manufactured by Yuasa Ionics Inc.), according to the BJH method attached to the NOVA enhanced data analysis package. Incidentally, the calculations of the pore diameter distribution, the total pore volume, and the like were carried out by analyzing the desorption leg.

(1) Manufacturing of Precursor Fiber of Fibrous Active Carbon

Manufacturing of Precursor Fiber 1 of Fibrous Active Carbon

A solution containing 1 part by weight of polyacrylonitrile (manufactured by Wako Pure Chemical Industries, Ltd.) and 9 parts by weight of N,N-dimethylformamide (Wako Pure Chemical Industries, Ltd., reagent special grade) was formed. By means of an apparatus shown in FIG. 2, the solution was discharged to a fibrous material collecting electrode for 30 minutes, thereby to form a nonwoven fabric. Incidentally, the internal diameter of the solution jet nozzle was 0.8 mm; the voltage, 12 kV; and the distance between the solution jet nozzle and the fibrous material collecting electrode 5, 10 cm.

The nonwoven fabric was heated in the air from 30° C. to 300° C. at 1° C./min, and then, heated under a nitrogen atmosphere from 300° C. to 1300° C. at 5° C./min, resulting in a carbonized nonwoven fabric. Incidentally, the carbonized nonwoven fabric was measured by means of a scanning electron microscope (S-2400 manufactured by Hitachi Ltd.), and the average fiber diameter was 100 nm. The carbonized nonwoven fabric obtained above is referred to as a precursor fiber 1 of the fibrous active carbon.

Manufacturing of Precursor Fiber 2 of Fibrous Active Carbon

As a thermoplastic resin, 100 parts by weight of poly-4-methylpentene-1 (TPX: grade RT-18 [manufactured by Mitsui Chemical Co., Ltd.]) and 11.1 parts by weight of mesophase pitch AR-HP (manufactured by Mitsubishi Gas Chemical Company, Inc.) were melt-kneaded by means of a co-rotating twin screw extruder (TEX-30, manufactured by the Japan Steel Works, Ltd., barrel temperature 290° C., under a nitrogen flow) to form a resin composition. The resin composition was spun from the spinneret at 300° C., resulting in a composite fiber.

Then, the resulting composite fiber was held in the air at 200° C. for 20 hours, resulting in a composite fiber subjected to a stabilization treatment. Then, the composite fiber subjected to a stabilization treatment was heated up to 500° C. at 1° C./minute under a nitrogen atmosphere to remove the thermoplastic resin. After the removal of the thermoplastic resin, burning was carried out from 30° C. to 700° C. at 5° C./minute under a nitrogen atmosphere, resulting in a precursor fiber 2 of a fibrous active carbon. Incidentally, the average fiber diameter evaluated from the electron micrograph was 200 nm.

Example 1

Figure 3:
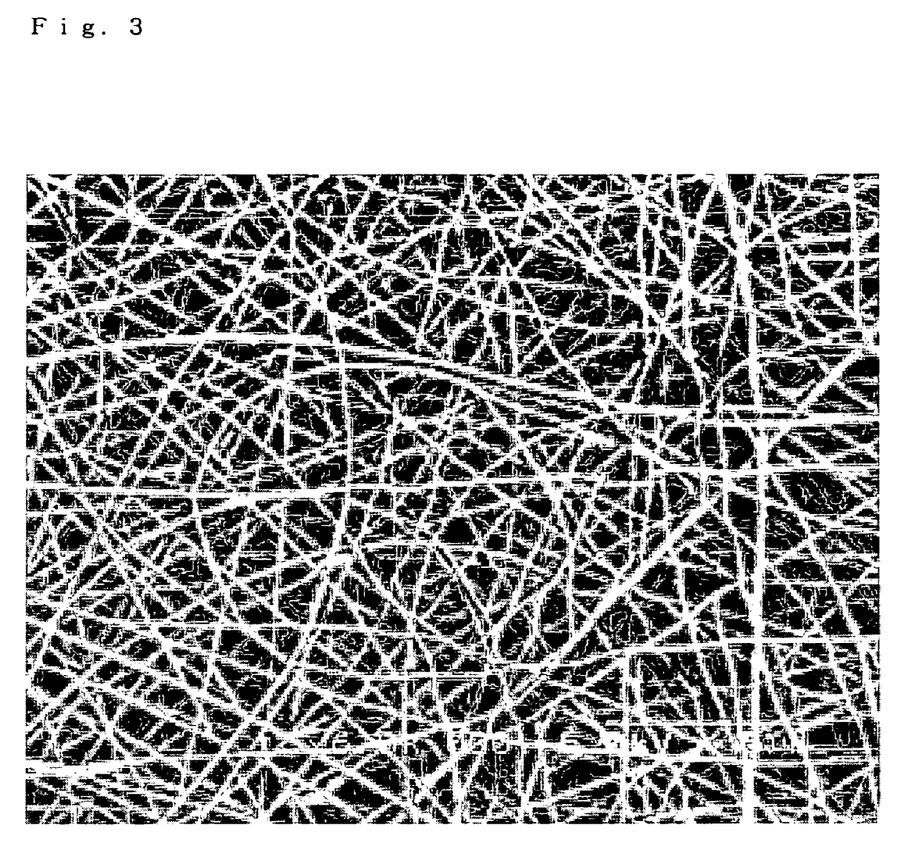
FIG. 3 is a photographic picture obtained by photographing (6000 times) the surface of a fibrous active carbon (in the form of a nonwoven fabric) obtained through the operation of Example 1 by means of a scanning electron microscope, wherein the scale on the lower right hand side of the diagram is 5 μm.

The precursor fiber 1 of a fibrous active carbon was subjected to a water vapor activation treatment at 850° C. for 1 hour to form a nonwoven fabric including a fibrous active carbon. The electron micrograph thereof is shown in FIG. 3. The average fiber diameter of the fibrous active carbon evaluated by an electron microscope was 100 nm. Incidentally, the total specific surface area evaluated from the amount of nitrogen adsorbed was 1300 $m^2/g$. Whereas, in the pore diameter distribution determined from the nitrogen adsorption isotherm, the specific surface area of a pore diameter of 2 nm or more was 550 $m^2/g$, and the ratio of the specific surface area of a pore diameter of 2 nm or more and the total specific surface area was 0.3 or more. Further, the total pore volume was 0.8 cc/g, and the pore volume of 2 to 5 nm was 0.45 cc/g, corresponding to 56% of the total pore volume.

Example 2

Figure 4:
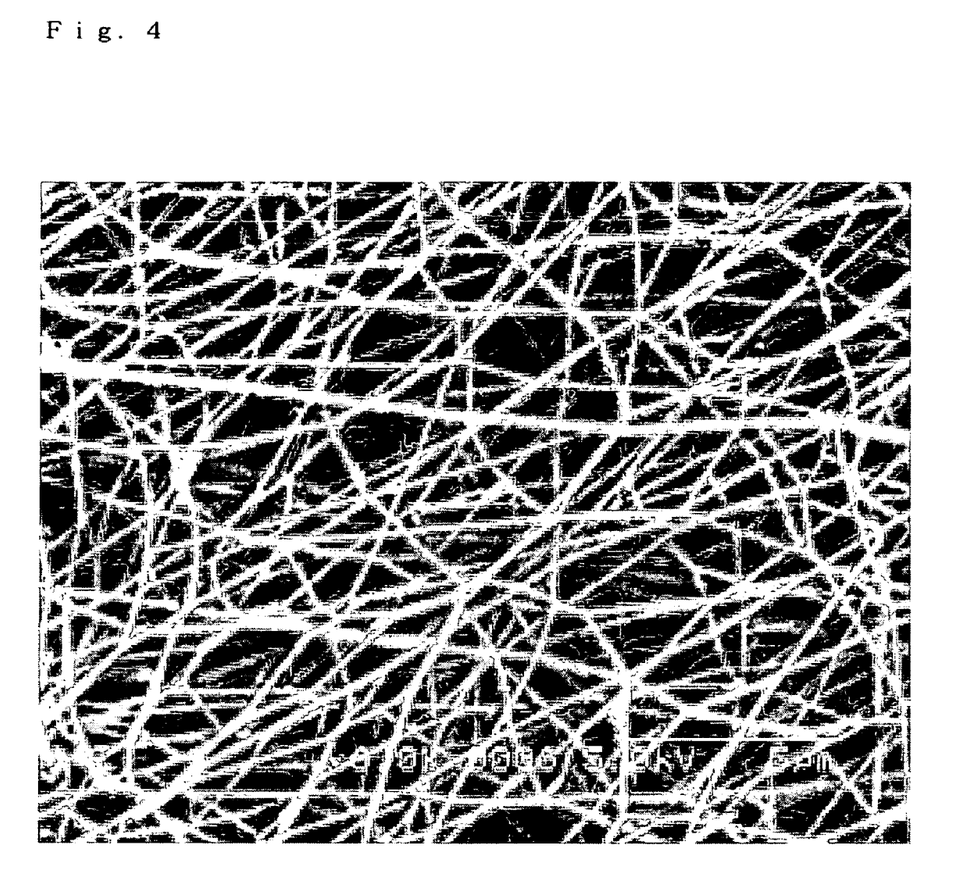
FIG. 4 is a photographic picture obtained by photographing (6000 times) the surface of a fibrous active carbon (in the form of a nonwoven fabric) obtained through the operation of Example 2 by means of a scanning electron microscope, wherein the scale on the lower right hand side of the diagram is 5 μm.

One part by weight of the precursor fiber 1 of a fibrous active carbon was immersed in 5 parts by weight of a 2.5 wt % potassium hydroxide aqueous solution. Then, this solution was heated up to 800° C. under a nitrogen atmosphere at 5° C./minute, and held for 30 minutes. Thereafter, washing with water was repeated 3 times, and then, vacuum drying was carried out at 200° C. for one day and night to form a nonwoven fabric including a fibrous active carbon. The electron micrograph of the fibrous active carbon is shown in FIG. 4.

The average fiber diameter of the fibrous active carbon evaluated by an electron microscope was 100 nm. Incidentally, the total specific surface area evaluated from the amount of nitrogen adsorbed was 2200 $m^2/g$. Whereas, in the pore diameter distribution determined from the nitrogen adsorption isotherm, the specific surface area of a pore diameter of 2 nm or more was 1200 $m^2/g$, and the ratio of the specific surface area of a pore diameter of 2 nm or more and the total specific surface area was 0.3 or more. Further, the total pore volume was 0.70 cc/g, and the pore volume of 2 to 5 nm was 0.29 cc/g, corresponding to 42% of the total pore volume.

Example 3

Figure 5:
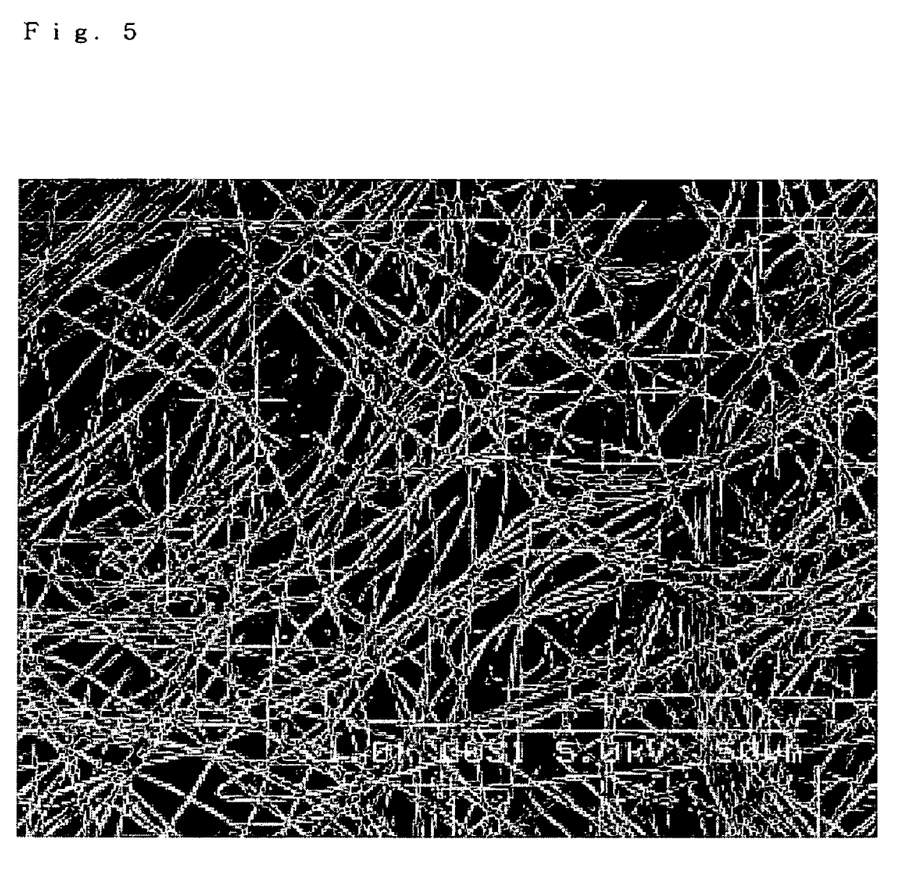
FIG. 5 is a photographic picture obtained by photographing (1000 times) the surface of a fibrous active carbon (in the form of a nonwoven fabric) obtained through the operation of Example 3 by means of a scanning electron microscope, wherein the scale on the lower right hand side of the diagram is 50 μm.
Figure 6:
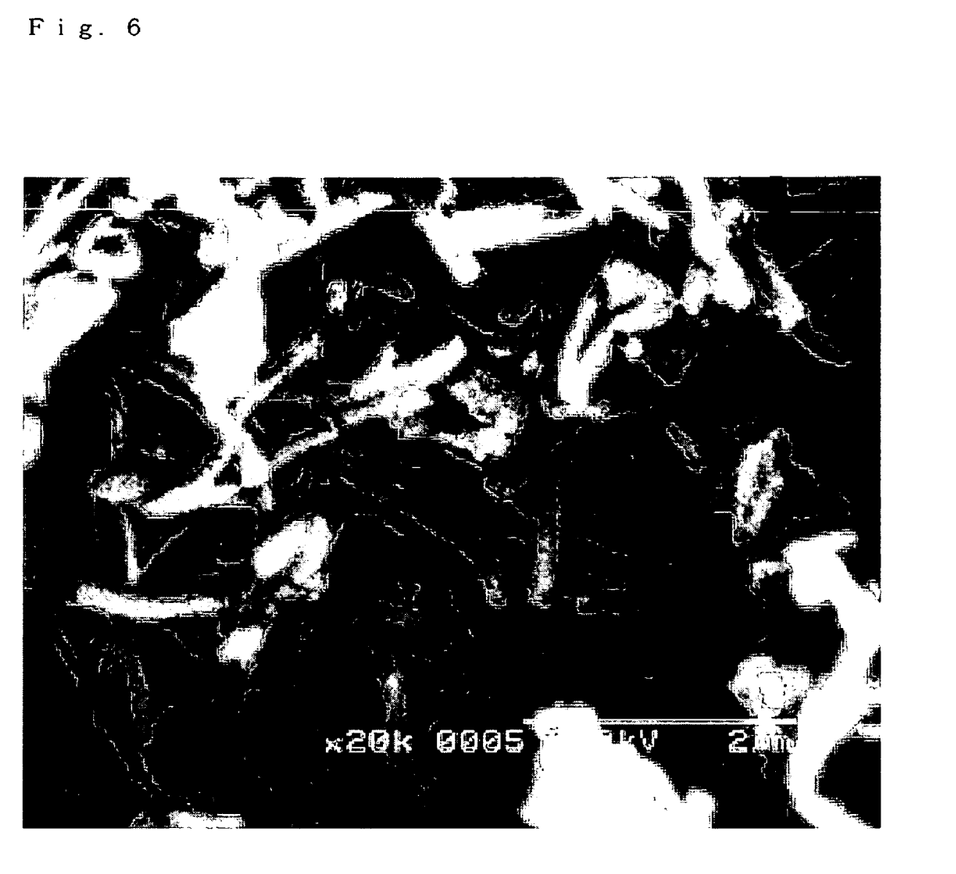
FIG. 6 is a photographic picture obtained by photographing (20000 times) the surface of a fibrous active carbon (in the form of a nonwoven fabric) obtained through the operation of Example 4 by means of a scanning electron microscope, wherein the scale on the lower right hand side of the diagram is 2 μm.

One part by weight of the precursor fiber 2 of a fibrous active carbon was immersed in 5 parts by weight of a 30 wt % potassium hydroxide aqueous solution. Then, this solution was heated up to 800° C. under a nitrogen atmosphere at 5° C./minute, and held for 30 minutes. Thereafter, washing with water was repeated 3 times, and then, vacuum drying was carried out at 200° C. for one day and night to form a fibrous active carbon. The electron micrograph thereof is shown in FIG. 5. The average fiber diameter of the fibrous active carbon evaluated by an electron microscope was 200 nm. The total specific surface area evaluated from the amount of nitrogen adsorbed was 980 $m^2/g$. Whereas, in the pore diameter distribution determined from the nitrogen adsorption isotherm, the specific surface area of a pore diameter of 2 nm or more was 350 $m^2/g$, and the ratio of the specific surface area of a pore diameter of 2 nm or more and the total specific surface area was 0.3 or more. Further, the total pore volume was 0.58 cc/g, and the pore volume of 2 to 5 nm was 0.25 cc/g, corresponding to 43% of the total pore volume.

Comparative Example 1

An active carbon powder having a specific surface area of 1204 $m^2/g$ (manufactured by Futamura Chemical Co., Ltd.) was immersed in a potassium hydroxide aqueous solution with a concentration of 50%. Thereafter, the slurry was heated up to 650° C. under a nitrogen atmosphere, and held for 60 minutes. Then, it was cooled to room temperature. It was washed with water, and then, placed in a drier, and dried at 115° C. The resulting active carbon was ground.

The total specific surface area of the resulting active carbon powder was 1655 $m^2/g$. Whereas, in the pore diameter distribution determined from the nitrogen adsorption isotherm, the specific surface area of a pore diameter of 2 nm or more was 1420 $m^2/g$, and the ratio of the specific surface area of a pore diameter of 2 nm or more and the total specific surface area was 0.3 or more.

The resulting active carbon is poor in moldability/processability because of the granular form, and hence could not be made into the form of a nonwoven fabric as in this application.

Example 4

One gram of the fibrous active carbon obtained through the operation of Example 1, and 50 mg of platinum acetylacetonate were charged in an autoclave. A treatment was carried out in $CO_2$ in the supercritical state at 70° C. and 50 MPa for 2 hours.

Then, the fibrous active carbon taken out from the autoclave was heated from room temperature (25° C.) to 2000° C. at 20° C./min in an argon gas. After the temperature had reached 2000° C., the sample was held for 0.5 hour, resulting in an electrode material for a fuel cell. Incidentally, during the treatment, an argon was flown, and the oxygen concentration was kept at 10 ppm or less.

The platinum carrying distribution was evaluated by means of an electron beam probe micro X-ray analyzer. As a result, it was indicated that platinum was uniformly carried on the cross section of the electrode material for a fuel cell. Whereas, the number and the sizes of the metal particles observed by a scanning electron microscope were measured, and the average particle diameter of the carried metal obtained by determining the average of the sizes was 20 nm. The metal was favorably dispersed, and no aggregation was observed.

Example 5

To the fibrous active carbon obtained by the operation of Example 1, a 5 wt % polytetrafluoroethylene as a binder was added and kneaded, thereby to prepare a 10-mm dia and 180-μm electric double layer capacitor electrode. For the electrolyte, a propylene carbonate solution of tetraethylammonium tetrafluoroborate was used, and for the separator, cellulose paper was used, resulting in an electric double layer capacitor. Charging was carried out up to 3 V with 5 mA, and 20-mA constant-current discharging was carried out to 0 V. The capacitance was determined from changes with 1.8- to 1.2-V potential/time in the discharge curve, and found to be 35 F/g.

The invention claimed is:

1. A method for manufacturing a fibrous active carbon, comprising a stage of spinning a mixture substantially made of a thermoplastic resin and a starting material for a fibrous active carbon, and forming a precursor fiber, a stage of subjecting the precursor fiber to a stabilization treatment, stabilizing the thermoplastic carbon precursor in the precursor fiber, and forming a stabilized precursor fiber, a stage of removing the thermoplastic resin from the stabilized precursor fiber, and forming a fibrous carbon precursor, a stage of subjecting the fibrous carbon precursor to a carbonization or graphitization treatment, and obtaining a carbon fiber, and a stage of activating the resulting carbon fiber, and obtaining a fibrous active carbon.

2. The manufacturing method according to claim 1, wherein the activation treatment is carried out by water vapor activation and/or alkali activation.

3. The manufacturing method according to claim 1, wherein the starting material of the fibrous active carbon is polyacrylonitrile.

4. The manufacturing method according to claim 1, wherein the starting material of the fibrous active carbon is a pitch.

5. The manufacturing method according to claim 1, wherein the pitch is a mesophase pitch.

* * * * *